United States Patent [19]

Fujii et al.

[11] Patent Number: 5,683,634
[45] Date of Patent: Nov. 4, 1997

[54] PROCESS OF MAKING POROUS FILMS OR SHEETS

[75] Inventors: Toshio Fujii; Keishin Handa; Kyosuke Watanabe, all of Kurashiki, Japan

[73] Assignee: Mitsubishi Chemical Corporation, Japan

[21] Appl. No.: 540,216

[22] Filed: Oct. 6, 1995

Related U.S. Application Data

[62] Division of Ser. No. 140,359, Oct. 25, 1993, abandoned.

[30] Foreign Application Priority Data

Dec. 21, 1992 [JP] Japan ................................ 4-340659
May 11, 1993 [JP] Japan ................................ 5-109619

[51] Int. Cl.$^6$ ................... B29C 47/78; B29C 55/04; B29C 55/12; B29C 67/20
[52] U.S. Cl. ................ 264/41; 264/210.4; 264/210.6; 264/211.19; 264/344; 264/564
[58] Field of Search ............................. 264/41, 49, 154, 264/210.4, 210.6, 211, 211.19, 344, 564

[56] References Cited

U.S. PATENT DOCUMENTS

| | | | |
|---|---|---|---|
| 4,237,083 | 12/1980 | Young et al. | 264/41 |
| 4,731,304 | 3/1988 | Lundquist et al. | 429/62 |
| 4,833,172 | 5/1989 | Schwarz | 264/41 X |
| 4,873,034 | 10/1989 | Kono et al. | 264/41 |
| 5,240,655 | 8/1993 | Troffkin et al. | 264/41 X |

FOREIGN PATENT DOCUMENTS

| | | |
|---|---|---|
| 355 214 | 2/1990 | European Pat. Off. . |
| 547 237 A1 | 6/1993 | European Pat. Off. . |
| 2-94356 | 4/1990 | Japan . |
| WO 93/01623 | 1/1993 | WIPO . |

OTHER PUBLICATIONS

Database WPI Derwent Publications Ltd., London AN 93-191608[24] & JP-A-5 117 440 May 1993 (Mitsubishi Kasei Corp.) Abstract.

Database WPI Derwent Publications Ltd., London AN 88-107426[16] & JP-A-62 254 806 (Mitsubishi Chem. Ind. KK.) Nov. 1987 Abstract.

*Primary Examiner*—Leo B. Tentoni
*Attorney, Agent, or Firm*—Nixon & Vanderhye

[57] ABSTRACT

A porous film or sheet including a resin composition mainly of an ultra-high molecular weight polyethylene having a viscosity-average molecular weight of not less than 500,000, and having a thickness of 10 to 100 µm, an air permeability of 20 to 2,000 sec/100 cc, a porosity of 15 to 80%, a pin puncture strength (per 25 µm of film thickness) of not less than 120 g, a thermal-shut down temperature of 90° to 150° C. and a heat puncture temperature of not less than 160° C., and a process for producing the same.

9 Claims, No Drawings

PROCESS OF MAKING POROUS FILMS OR SHEETS

This is a division of application Ser. No. 08/140,359, filed Oct. 25, 1993 (now abandoned).

BACKGROUND OF THE INVENTION

The present invention relates to a porous film or sheet, a battery separator made of such film or sheet, a lithium battery using such battery separator, and a process for producing the porous film or sheet.

Porous films or sheets have been used for a variety of commercial products, such as battery separators, separating membranes such as a precision filter membrane, clothings such as an air-permeable jumper, sanitary articles such as a diaper, a sanitary napkin, etc. There have been also proposed various processes for producing such porous resin moldings. For instance, a porous resin molding used as a battery separator is usually produced by once forming a film or sheet from a resin composition containing an ultra-high molecular weight polyethylene and a plasticizer by melt extrusion, after removing the plasticizer in the film or sheet by dissolving the plasticizer with an organic solvent such as isopropanol, ethanol, hexane or the like, and stretching the film or sheet, that is, effectuating its solid phase drafting, by a stretcher such as a roll stretcher or tenter, a transversal direction stretcher for enhancing mechanical strength of the film or sheet.

With the development of small-sized portable machinery and apparatus, the corresponding small-sized high-performance batteries are demanded. Lithium battery, because of use of lithium which is the most base metal, is capable of generating a high voltage. Lithium is very useful as an electrode material for small-sized high-performance batteries, but this substance has high reactivity and a false treatment thereof may lead to a serious accident. In fact, the combustion cases of from a lithium battery have been reported in the past, and assurance of safety in use is a important problem for lithium batteries.

The lower heat durability of the battery separator under high temperatures leads to troubles such as shortcircuiting which may cause flow of a large current in a short period of time and consequent heat generation by the battery to cause damage to the separator and internal shortcircuiting. Therefore, the separator is required to possess the characteristics that the pores therefore automatically closed by heat (thermal self-shut down property) on rise of internal temperature of the battery and properties to retain the film form and keep the electrodes separate from each other even under high temperatures (hereinafter referred to as "a film-form retainability under a high temperature" (="a heat durability")).

However, the film or sheet which has undergone solid phase drafting described above has the entangled molecular chains of the ultra-high molecular weight polyethylene and also has high residual stress, so that such film or sheet had the problem of possible break when exposed to a temperature above a certain level in a fixed state, for example in the state of being applied in a battery, and thus there has been a limit to improvement of the heat durability attainable with the conventional art.

The polypropylene separator film has excellent film-form retainability under high temperature, but its use as a lithium battery separator is problematic since the temperature at which this film exhibits its self-shut down property is around 175° C., which is close to the ignition temperature (180° C.) of lithium.

Also, the separator film is usually stretched for enhancing its strength, but the stretched film is low in film-form retainability under high temperature. For example, polyethylene film is broken when placed under a temperature of 150° to 160° C., while polypropylene film is ruptured when exposed to a temperature close to 180° C., thereby giving rise to the problem of improper insulation of the electrodes in which such film is used.

As a result of the present inventors' strenuous studies for eliminating the above defects, it has been found that by melt-extruding a resin composition composed of an ultra-high molecular weight polyethylene having a viscosity-average molecular weight of not less than 500,000 and a plasticizer to form film- or sheet-like product, melt-drafting (melt-deforming) by applying a deforming stress to the film- or sheet-like product and, after cooling, removing the plasticizer contained in the film- or sheet-like product, the obtained porous film or sheet is small in residual stress, excellent in heat durability and improved in surface strength, and there can be obtained such porous film or sheet without stretching treatment and in an industrially advantageous process. The present invention has been achieved on the basis of this finding.

SUMMARY OF THE INVENTION

An object of the present invention is to provide a porous film or sheet which is small in residual stress, excellent in heat durability, high in surface strength, excellent in pin-puncture strength and low in thermal-shut down temperature.

To achieve the aim, in a first aspect of the present invention, there is provided a porous film or sheet comprising a resin composition composed mainly of an ultra-high molecular weight polyethylene having a viscosity-average molecular weight of not less than 500,000, and having a thickness of 10 to 100 μm, an air permeability of 20 to 2,000 sec/100 cc, a porosity of 15 to 80%, a pin-puncture strength (per 25 μm of film thickness) of not less than 120 g, a thermal-shut down temperature of 90° to 150° C. and a heat rupture temperature of not less than 160° C.

In a second aspect of the present invention, there is provided a battery separator comprising a porous film or sheet as defined in the first aspect.

In a third aspect of the present invention, there is provided a lithium battery comprising a positive electrode, a negative electrode, and a battery separator as defined in the second aspect, disposed between the positive and negative electrodes.

In a fourth aspect of the present invention, there is provided a process for producing a porous film or sheet, which comprises melt-extruding a composition composed principally of a resin composition containing an ultra-high molecular weight polyethylene having a viscosity-average molecular weight of not less than 500,000 and a plasticizer into a film- or a sheet-like product, giving a deforming stress thereto to effectuate melt-draft, and after cooling, removing the plasticizer from the obtained film or sheet.

In a fifth aspect of the present invention, there is provided a porous film or sheet comprising a resin composition composed mainly of an ultra-high molecular weight polyethylene having a viscosity-average molecular weight of not less than 500,000, and having a thickness of 10 to 100 μm, an air permeability of 20 to 2,000 sec/100 cc, a porosity of 15 to 80%, a thermal-shut down temperature of 90° to 150° C. and a heat puncture temperature of not less than 160° C., which is obtained by a process comprising melt-extruding a composition composed principally of a resin composition containing an ultra-high molecular weight polyethylene having a viscosity-average molecular weight of not less than 500,000 and a plasticizer into a film- or a sheet-like product, giving a deforming stress thereto to effectuate melt-draft, and after cooling, removing the plasticizer from the obtained film or sheet.

DETAILED DESCRIPTION OF THE INVENTION

The ultra-high molecular weight polyethylene used in the present invention is, for instance, a straight-chain polyethylene having a viscosity-average molecular weight (hereinafter referred to simply as "molecular weight") of not less than 500,000. In use of the film or sheet as a battery separator, if the molecular weight of the polyethylene is less than 500,000, the separator made thereof can hardly maintain its original shape when heated to, for example, 180° C. by the self-heat generation (self-exothermic) in the battery or the heat applied externally. Also, if the molecular weight of the polyethylene is too large, such as not less than 4,000,000, its fluidity proves so low that when the separator is heated, its pores may not be shut down, thereby causing to cause short-circuiting which may initiate ignition of the battery. Accordingly, it is preferable to use an ultra-high molecular weight polyethylene having a molecular weight of 500,000 to 4,000,000, more preferably 1,500,000 to 3,000,000.

Also, in the present invention, it is preferred to use an ultra-high molecular weight polyethylene having a melting temperature of 110° to 140° C. because of easiness of melt-drafting (melt-deformation).

In the present invention, it is possible to jointly use polybutene-1, polypropylene or a polyethylene having a viscosity-average molecular weight of less than 500,000 in a mixing ratio (amount) of not more than 100 wt %, preferably 2 to 80 wt % based on the ultra-high molecular weight polyethylene.

Examples of the polyethylenes that can be jointly used in the present invention include branch or linear low-density polyethylenes (viscosity-average molecular weight: 5,000 to 100,000), high-density polyethylenes (viscosity-average molecular weight: 10,000 to 500,000) and polyethylene waxes (viscosity-average molecular weight: less than 5,000). Polybutene-1 and polypropylene usable in the present invention are those having a viscosity-average molecular weight not more than 4,000,000.

Joint use of a low-density or high-density polyethylene, polybutene-1 or polyethylene wax in a mixing ratio (amount) of not more than 100 wt %, preferably 1 to 100 wt %, more preferably 30 to 90 wt %, still more preferably 40 to 80 wt % based on the ultra-high molecular weight polyethylene contributes to lowering the thermal-shut down temperature of the pores film or sheet. Also, joint use of polypropylene or polybutene-1 in a mixing ratio (amount) of not more than 100 wt %, preferably 1 to 100 wt %, more preferably 1 to 60 wt %, still more preferably 2 to 40 wt % based on the ultra-high molecular weight polyethylene contributes to enhancement of the film or sheet strength.

The plasticizers usable in the present invention include various kinds of known plasticizers which have good compatibility with the ultra-high molecular weight polyethylenes and won't be evaporated in the course of melt kneading or molding, for example, those having a higher boiling point than the melting temperature of the ultra-high molecular weight polyethylene. Typical examples of such plasticizers are paraffin waxes which are solid at normal temperature, n-alkanes such as n-decane and n-dodecane which are liquid at normal temperature, liquid paraffin and kerosine.

As for the content of the ultra-high molecular weight polyethylene and the plasticizer in a composition, usually the content of the ultra-high molecular weight polyethylene is 5 to 60 wt %, preferably 10 to 50 wt %, while the content of the plasticizer is 40 to 95 wt %, preferably 50–90 wt %.

The composition composed of the ultra-high molecular weight polyethylene and the plasticizer according to the present invention may contain various kinds of known additives such as, for example, anti-oxidant in an amount of about 0.01 to 5 wt % based on the composition.

The composition are uniformly kneaded and melt extruded by a known single- or twin-screw extruder. Use of a twin-screw extruder is preferred in view of high extrusion rate, extrusion stability and mixing intensity. Melt extrusion is usually carried out at a temperature of 140° to 240° C. to form a film or sheet having 10 to 50 μm or 50 to 300 μm in thickness.

In the present invention, the thus obtained film or sheet is subjected to melt-draft (melt-deformed). Such melt-draft (melt-deformation) is conducted by utilizing the property of the ultra-high molecular weight polyethylene that the molecular weight thereof is very large, it is hardly subject to orientational relaxation of the molecular chain on drafting and the molecular chain tends to be oriented in the direction of drafting, so as to attain an improvement of mechanical strength of the finally obtained porous film or sheet.

Melt-draft (melt-deformation) is performed by applying a deforming stress to the extruded film- or sheet-like product, while keeping it in a molten state. Usually a deforming stress is applied in a state so controlled that the temperature of the composition is maintained in the range of 130° to 240° C. preferably 160° to 200° C. Drafting may not necessarily be applied in one direction alone; it is possible to perform drafting in two or more directions.

In case of using the film or sheet as a battery separator, if it is drafted in one direction alone, the pores in the film or sheet assume a form stretched in the direction of drafting, which narrows, if not greatly, the fluid passage to reduce air permeability, resulting in an increased ion resistivity of the separator. It is thus preferable to conduct melt-drafting (melt-deforming) evenly in the multiple directions so as to uniformly expand the pores in the film or sheet.

More specifically, in case, for instance, the film or sheet is drafted in one direction alone, melt-drafting (melt-deforming) is conducted in the machine direction by enlarging the die gap and pulling the film or sheet at an increased take-off speed, that is, elevating the draft ratio, in the T-die or inflation molding method, preferably the inflation molding method. In case the film or sheet is drafted in the multiple directions, the melt-draft (melt-deformation) is performed in both machine direction and transverse direction by increasing draft ratio as well as blow-up ratio in the inflation method. Further, in case of drafting in the multiple directions according to the T-die molding method, the width-wise ends of the film or sheet in the molten state are fixed to the caterpillars by a pin tenter and the width of the two caterpillars is expanded in accordance with the flowing direction to effect drafting in the transverse direction, while at the same time executing drafting in the machine direction by raising the take-off speed.

In the present invention, the melt-drafting ratio is not specifically defined as far as it falls within the range where such draft gives not adverse effect to the concept of the present invention, but usually it is desirable to apply a deforming stress so that the melt-draft ratio represented by the formula shown below is 5 to 1,000, preferably 10 to 1,000, more preferably 30 to 800, still more preferably 50 to 400.

For instance, in case a deforming stress is applied in both machine and transverse directions, the melt-draft (melt-deformation) is preferably accomplished at Dr/BUR≦50, more preferably Dr/BUR≦20, even more preferably Dr/BUR≦10, wherein Dr represents a melt-draft ratio (melt-deformation ratio) and BUR represents a blow-up ratio.

Melt-draft ratio $(Dr)=(D \times \rho_1)/(t \times \rho_2)$

D: die gap (mm)
$\rho_1$: melt density (g/cm$^3$) of the resin composition
t: molded film or sheet thickness (mm)
$\rho_2$: solid density (g/cm$^3$) of the molded film or sheet In the art of film or sheet molding by inflation method, it is known to produce a polyethylene film by conducting melt-draft on the molded film by using a circular die having a die gap of 0.5 mm (JP-A-223245). Hitherto, for molding a film or sheet having a thickness of 10 to 100 μm, it has been common practice to set the die gap usually at not more than 1 mm, not exceeding 1.5 mm at most.

However, the films or sheets molded by using the circular die having the die gap of less than 1.5 mm is not always satisfactory in strength, especially in pin-puncture strength.

For obtaining a battery separator having a more satisfactory strength, it is preferable to set the die gap in a specific range and to also regulate the cooling speed as described below. In the present invention, it is preferable to carry out molding by setting the die gap preferably 2 to 20 mm, more preferably 3 to 10 mm.

The film or sheet which has undergone melt-draft as described above is cooled to room temperature and then the plasticizer contained in the cooled film or sheet is removed to make the film or sheet porous.

Above cooling is preferably carried out so that the cooling solidification time represented by the following formula become not more than 50 seconds, preferably not more than 20 seconds. Too long a cooling solidification time allows excessive advancement of phase separation, which enlarges the pore diameter and lowers film strength.

$$T = \frac{L}{V_1 - V_0} \ln\left(\frac{V_1}{V_2}\right)$$

T: cooling solidification time (sec)
L: distance between lip outlet and cooling & solidifying line (cm) (for example, F.L.H. in inflation, and air gap in T-die)
$V_0$: resin transfer speed (cm/sec) at lip outlet
$V_1$: resin transfer speed (cm/sec) in cooling & solidifying line For removal of the plasticizer in the film or sheet, there can be employed, for example, a known "organic solvent method" in which the plasticizer in the film or sheet is dissolved with an organic solvent such as isopropanol, ethanol, hexane or the like and extracted away through solvent substitution.

The film or sheet which has been made porous by removing the plasticizer in the manner described above can be then subjected to uniaxial or biaxial stretching for more improvement of its mechanical strength. It may be further subjected to heat-setting at a temperature of about 100° to 180° C.

It is recommendable to use a film or sheet which has not been subjected to stretching-treatment since stretching of the film or sheet tends to lower the film-form retainability under high temperature.

In accordance with the present invention, it is possible to obtain a porous film or sheet having a thickness of 10 to 100 μm, preferably 15 to 60 μm. In the porous film or sheet of the present invention, an average pore diameter is usually not more than 1 μm, preferably about 0.01 to 1 μm, an air permeability is 20 to 2,000 sec/100 cc, preferably 100 to 700 sec/100 cc, and a porosity is in the range of 15 to 80%, preferably 30 to 70%.

Air permeability was determined according to JIS P8117 using a B-type Galay Denso Meter (trade name) manufactured by Toyo Seiki Co., Ltd.

Also, the film or sheet obtained according to the present invention is excellent in mechanical strength and heat durability, and in addition, especially excellent in pin-puncture strength.

Pin-puncture strength was determined according to JAS (Japanese Agricultural Standard) Notification No. 1019 [measuring apparatus: Rheometer (NRM-2002J mfd. by Fudo Industrial Co., Ltd.); pin diameter: 1 mm; tip: 0.5 R; pin puncturing speed: 300 mm/min]. According to the present invention, there can be obtained the films or sheets having a pin-puncture strength as determined by the above method of not less than 120 g, preferably not less than 140 g, more preferably 170 to 300 g (calculated as a film thickness of 25 μm).

Heat durability is an index of the tendency of a film or sheet to break under compression stress generated by the heat in the high temperature zone of the film or sheet. This is an important characteristic since the film or sheet, when used as a battery separator, is required to maintain its initial shape to keep the electrodes separate from each other even under a high temperature condition.

For determination of a thermal-shut down temperature and heat rupture temperature, there were prepared the 8 cm square Teflon films (TF) and aluminum plates (Al), each having a 4 cm-diameter opening at the center, and they were placed one on the other along with a porous film in the order of Al/TF/porous film/TF/Al and the superposed product was secured by clips (other means may be employed for securing) to form a test piece. The test piece was placed in a 130° C. oven and heated at a rate of 5° C./5 min. Samples were taken out every five minutes and their air permeability was measured (JIS P8117). The temperature at which air permeability became 0 is herein called "thermal-shut down temperature". In the above process, with heating continued, the temperature at which the visually recognizable hole(s) was (were) formed was called "heat rupture temperature" of the film.

For determining porosity, the 3 cm-diameter circles were punched out from the test film at five positions in the widthwise direction, and the thickness of the central part as well as the weight of the punched out film pieces were measured. Porosity was calculated from the following formula.

Porosity $(\%)=(V\rho-W)/(V\rho)\times 100$

V: film volume (total of five pieces)
W: film weight (total of five pieces)
$\rho$: density The porous film or sheet obtained according to the present invention is also admirable from the viewpoint of safety of the battery, since its thermal-shut down temperature, viz. the temperature at which the film or sheet exhibits its thermal self-shut down property when kept at a prescribed temperature for 5 minutes, is 90° to 150° C., preferably 105° to 135° C. When the film pores are shut down at a temperature of less than 90° C., there arise the problems in practical use of the film, and when the thermal-shut down temperature is more than 150° C., the battery tends to be brought into an overheated condition in use.

The heat rupture temperature of the film of the present invention is not lower than 160° C., preferably not lower than 180° C., more preferably not lower than 200° C. If the heat rupture temperature of the film is less than 160° C., even if the separator pores are shut down at around 150° C., since heat is accumulated in the battery, there can take place rapid rise of temperature and the interior temperature of the battery may become higher than 160° C. by virtue of the remaining heat.

Further, when the film is heated at a temperature above the melting point (usually around 135° C.) of the polyethylene and usually below 200° C. for about 1 to 2 minutes, an air permeability of the film becomes not less than 1,000 sec/100 cc, which enables shut-off of ionic current and makes it impossible to stop the electrode reactions in the event of occurrence of abnormal heat generation due to shortcircuiting or other trouble in the battery.

An ultimate strength of the film according to the present invention is preferably not lower than 100 kg/cm$^2$ in both machine and transverse directions. When it is lower than 100 kg/cm$^2$, the film may become to rupture in the course of film-manufacture or cartridge working of a filter membrane, resulting in poor workability. A bubble point is preferably 2 to 6 kg/cm$^2$. If the bubble point is less than 2 kg/cm$^2$, the pore structure of the film may become coarse and as a result, there is the risk of the electrodes being brought into contact with each other when the film is applied as a battery separator. If the bubble point is more than 6 kg/cm$^2$, the pore structure may become too compact, which is obstructive to filtration or ion transmission.

A shrinkage stress in a machine direction and transverse direction of the film according to the present invention is preferably not more than 20 gf, more preferably 1 to 10 gf. If the shrinkage stress in a machine direction and transverse direction of the film is too large, the film-form retainability under a high temperature may become to deteriorate.

A water permeability of the film or sheet according to the present invention is preferably 100 to 1,500. liters/hr.m$^2$.atm. If its water permeability is less than 100 liters/hr.m$^2$.atm, the film may be impractically low in filtering speed. If its water permeability exceeds 1,500 liters/hr.m$^2$.atm, the pore structure may become coarse and as a result, there is the risk of the electrodes being brought into contact with each other when the film is applied as a battery separator.

The separator should be capable of inhibiting passage of not less than 50 % of the 0.091 µm styrene latex particles. Otherwise, the separator is unsatisfactory in filtering performance.

Therefore, it is preferable in terms of assurance of safety that the difference between thermal-shut down temperature and heat rupture temperature of the separator is large. It is preferable that the difference between said both temperatures is not less than 30° C., preferably not less than 50° C., in view of rise of temperature which may continue even after thermal-shut down. This gives extra assurance of safety and provides a useful separator.

The battery separator of the present invention finds particularly useful for lithium batteries, lithium ion secondary batteries and the like.

The lithium battery according to the present invention comprises a separator composed of the porous film or sheet, a non-protonic electrolyte, an electrode composed of lithium and an electrode.

First, a non-protonic electrolyte is filled and/or impregnated in the pores of the separator. Filling and/or impregnation can be effected easily by a suitable method such as dropping, dipping, spreading or spraying, owing to the fact that since the porous film or sheet has pores of an average through-pore diameter of 0.001 to 0.1 µm, the non-protonic electrolyte which makes a contact angle of 90° with the film or sheet is easily taken up in the pores by a capillary condensing action.

As the non-protonic electrolyte, there can be used the solutions prepared by dissolving a lithium salt such as LiBF$_4$ or LiClO$_4$ in an organic solvent such as propylene carbonate, dimethyl sulfoxide, 3-methyl-1,3-oxazoline-2-one, sulfolane, 1,2-dimethoxyethane, 2-methyltetrahydrofuran, γ-butyl lactone, tetrahydrofuran and a mixture thereof. Especially the solutions composed of the combinations of propylene carbonate, 1,2-dimethoxyethane and LiBF$_4$; dimethyl sulfoxide, 1,2-dimethoxyethane and LiBF$_6$; and propylene carbonate, 1,2-dimethoxyethane and LiClO$_4$ are preferred as an electroconductivity of these solutions at room temperature is $10^{-3}$ to $10^{-2}$ s/cm.

As a positive electrode active ingredient of the secondary (rechargable) lithium battery, lithium compounds, for example, oxides such as Li$_x$MoO$_2$ (0<x≦2), Li$_x$MoO$_3$ (0<x≦1), Li$_x$Mo$_2$O$_4$ (0<x≦2), Li$_x$MnO$_2$ (0<x≦1), Li$_x$Mn$_2$O$_4$ (0<x≦2), Li$_x$V$_2$O$_4$ (0<x≦2.5), Li$_x$V$_2$O$_3$ (0<x≦3.5), Li$_x$VO$_2$ (0<x≦1), Li$_x$WO$_2$ (0<x≦1), Li$_x$WO$_3$ (0<x≦1), Li$_x$TiO$_2$ (0<x≦1), Li$_x$Ti$_2$O$_4$ (0<x≦2), Li$_x$RuO$_2$ (0<x≦1), Li$_x$Fe$_2$O$_3$ (0<x≦2), Li$_x$Fe$_3$O$_4$ (0<x≦2), Li$_x$Cr$_2$O$_3$ (0<x≦3) and Li$_x$Cr$_3$O$_4$ (0<x≦3.8); sulfides such as Li$_x$V$_3$S$_5$ (0<x≦1.8), Li$_x$TaS$_2$ (0<x≦1), Li$_x$FeS (0<x≦1), Li$_x$FeS$_2$ (0<x≦1), Li$_x$NbS$_2$ (0<x≦2.4), Li$_x$MoS$_2$ (0<x≦3), Li$_x$TiS$_2$ (0<x≦1) and Li$_x$ZrS$_2$ (0<x≦1); seleniums such as Li$_x$NbSe$_2$ (0<x≦3) and Li$_x$VSe$_2$ (0<x≦1); Li$_x$NiPS$_2$ (0<x≦1.5); and Li$_x$FePS$_2$ (0<x≦1.5) may be exemplified. The content of the positive electrode active ingredient in the positive electrode is preferably 1 to 30 wt %, more preferably 2 to 20 wt %.

As a negative electrode active ingredient of the secondary lithium battery, a carbonaceous material such as thermal cracking carbonaceous materials, cokes (pitch, coke, needle coke, petroleum coke and the like), graphites, carbonized materials obtained by baking molded products of organic high-molecular compounds such as phenol resins, furan resins and the like, carbon fibers and an active carbon may be exemplified.

By using the separator made in the manner described above, it is possible to obtain a lithium battery having high reliability and safety.

The lithium battery of the present invention is a so-called non-aqueous electrolyte-type battery using a non-protonic electrolyte such as described above, and its structure is basically the same as the conventional lithium batteries of the same type. The separator of the present invention described above is set between the positive and negative electrodes.

For making a primary battery, the lithium compounds are used for the material of the negative electrode, while silver chromates, carbon fluorides, manganese dioxides, the carbonaceous material or the like is used for the material of the positive electrode. In the case of a secondary battery, a lithium-incorporated aluminum, a lithium-incorporated fusible alloy (an alloy containing Pb, Cd or In), a lithium-incorporated carbon or the like can be used for the material of the positive electrode, while a lameliar-structured metallic chalacogen compound such as $TiS_2$, $MoS_2$ or $NbSe_3$, a metal oxide having tunnel-like pores such as $CoO_2$, $Cr_2O_5$, $V_2O_5$ ($\cdot P_2O_5$) or $MnO_2$ ($\cdot LiO_2$), a conjugated high-molecular weight compound such as polyacetylene or polyaniline, or the like can be used for the material of the negative electrode.

In accordance with the present invention, it is possible to obtain a film or sheet having high mechanical strength by merely giving a deforming stress in a molten state without applying a stretching treatment (solid phase drafting). Further, since polyethylene is used in a molten state and drafting (deformation) is conducted in the presence of a plasticizer, the degree of freedom of the molecular chain is high and also the residual stress generated after drafting is small, so that the obtained film or sheet has excellent film-form retainability under high temperatures (=heat durability) as compared with the conventional films or sheets which have been subjected to a stretching treatment. Therefore, the film or sheet of the present invention can be used advantageously as a battery separator.

Use of the battery separator of the present invention in a secondary battery such as lithium battery proves helpful for preventing abnormal heating or breakdown of the battery itself in use and enables obtainment of a high-safety and high reliability secondary battery.

EXAMPLES

The present invention is explained in more detail in the following Examples; however, it should be recognized that the scope of the present invention is not restricted to these Examples.

The testing methods used in the Examples are as described below.

(1) Air permeability (sec/100 cc): JIS P 8117

(2) Porosity (%): (pore volume)/(volume of porous film)×100

(3) Pin puncture strength (g/25 μm of film thickness): JAS Notification No. 1019 (pin puncturing speed: 300 mm/min)

(4) Thermal-shut down temperature and heat rupture temperature of film:

There were prepared the 8 cm square Teflon films (TF) and aluminum plates (Al), each having a 4 cm-diameter opening at the center, and they were placed one on the other along with a porous film in the order of Al/TF/porous film/TF/Al and the superposed product was secured by clips (other means may be employed for securing) to form a test piece. The test piece was placed in a 130° C. oven and heated at a rate of 5° C./5 min. Samples were taken out every five minutes and their air permeability was measured (JIS P8117). The temperature at which air permeability became 0 is herein called "thermal-shut down temperature". In the above process, with heating continued, the temperature at which the visually recognizable hole(s) was (were) formed was called "heat rupture temperature" of the film.

(5) Ultimate strength ($kg/cm^2$): JIS K 6781

(6) Bubble point (BP): JIS K 3832

(7) Water permeability ($liters/hr.m^2.atm$): measured by using 8010 Model Cell (manufactured by Amicon Corp.) under differential pressure of 1 $kg/cm^2$ at a temperature of 23° C.

(8) Measurement of pore diameter (styrene latex particles inhibition rate):

The styrene latex particles having weight average particle sizes of 0.091 μm and 0.212 μm (produced by Dow Chemical Co., Ltd.) were dispersed in water and subjected to a permeation test by using 8010 Model Cell (manufactured by Amicon Corp.) under differential pressure of 1 $kg/cm^2$. The styrene latex concentrations before and after the test were measured by a UV meter and the styrene latex particles inhibition rate was determined from the following formula.

Inhibition rate (%) = [(concentration before permeation) −
(concentration after permeation)]/(concentration before permeation) × 100

(9) Shrinkage stress: measured by using INTESCO high-temperature tensilometer (manufactured by INTESCO Co., Ltd. under a width of 25 mm and a chuck distance of 50 mm at a temperature of 150° C., in which the test specimen was heated at a rate of 5° C./5 min. The resultant value was calculated as a film thickness of 25 μm to obtain the shrinkage stress.

EXAMPLE 1

20 parts by weight of ultra-high molecular weight polyethylene powder having a melting point of 135° C. and a molecular weight (viscosity-average) of $2 \times 10^6$ and 80 parts by weight of ceryl alcohol were supplied into a 40 mm ϕ extruder. The supplied materials were kneaded at a temperature of 230° C. and continuously extruded from a T-die having a width of 400 mm and a die gap of 2 mm, and the extruded product was taken off at a take-off speed of 2.5 m/min and melt-drafted in the machine direction (take-off direction) to obtain a sheet of 0.05 mm in thickness. In this process, the die temperature was set at 170° C., the linear velocity in the gap at 7.1 cm/min, and the draft ratio (Dr) at 35.1. The melt density of the resin composition used in this Example was 0.76 $g/cm^3$ and the solid density of the extruded sheet was 0.867 $g/cm^3$, so that the melt-draft ratio accomplished in said melt drafting was 35.1.

The resultant sheet was immersed in a 80° C. isopropyl alcohol and ceryl alcohol was extracted away from the sheet. Then the sheet was subjected to a heat-treatment for 30 seconds by the heated pinch rolls having a surface temperature of 125° C. to obtain a porous resin film of 27 μm in thickness. The properties of this film are shown in Tables 1 and 2. The obtained porous resin film (cut to 58 mm in wide and 1 m in length) was disposed between the positive electrode and the negative electrode of a lithium battery (positive electrode: lithium cobaltate; negative electrode: carbon (pitch coke); electrolyte: propylene carbonate) and wound up inwardly, and the assembly was placed in a metal container of 60 mm in length, 15 mm in diameter to form a secondary lithium battery.

The percent defectives in make-up of the secondary battery and the results of an external shortcircuiting test are shown in Table 1.

The percent defectives in battery make-up indicate the ratio of the films that could not be incorporated in the battery due to some trouble or other, such as film rupture suffered when the film was placed between the positive electrode and the negative electrode of a lithium battery and wound up while holding the laminate by puncturing it with a pin or such, to the total number of the films used in the test.

In the external shortcircuiting test, the positive electrode and the negative electrode of the battery were shortcircuited externally after the lithium battery has been make up, and the state of the battery was observed.

EXAMPLE 2

The same procedure as Example 1 was conducted except for use of a T-die having a width of 500 mm and a die gap of 6.2 mm and change of linear speed in the gap to 2.3 cm/min and take-off speed to 2.3/min (Dr: 98.8) to make a thick sheet of 0.055 mm in thickness. The melt-draft ratio provided by the above melt drafting was about 98.8.

Ceryl alcohol was removed from the sheet and then subjected to a heat-treatment in accordance with Example 1 to obtain a porous resin film of 28 μm in thickness. The properties of this film are shown in Tables 1 and 2. The obtained porous resin film was applied as a battery separator for a lithium battery in the same way as Example 1.

EXAMPLE 3

30 parts by weight of ultra-high molecular weight polyethylene powder having a melting point of 138° C. and a molecular weight (viscosity-average) of $3\times10^6$ and 70 parts by weight of stearyl alcohol were supplied into a 50 mm φ extruder. The supplied materials were kneaded at a temperature of 200° C. and continuously extruded from an inflation die having a diameter of 50 mm and a die gap of 4.5 mm, and the extruded product was taken off at a take-off speed of 10 m/min (die temperature: 180° C.; linear velocity at the gap: 25.4 cm/min; Dr: 39.3) and melt extruded at a blow ratio (BUR) of 2.4 to obtain a sheet of 0.043 mm in thickness. The melt density of the resin composition used in this Example was 0.79 g/cm³ and the solid density of the extruded sheet was 0.876 g/cm³. Accordingly, the melt-draft ratio provided in the above melt drafting was about 94.4.

This sheet was immersed in a 60° C. isopropyl alcohol to extract away stearyl alcohol and then heat-treated according to Example 1 to obtain a porous resin film having a thickness of 24 μm. The properties of this film are shown in Tables 1 and 2. The obtained porous resin film was used as a lithium battery separator in the same manner as Example 1. The test results are shown in Table 1.

EXAMPLE 4

The same procedure as Example 3 was carried out by using an inflation die having a die diameter of 40 mm and a die gap of 0.28 mm and conducting melt-draft (melt-draft ratio: about 5.5) at a die temperature of 170° C., Dr of 1.0 and BUR of 5.5, followed by removal of the plasticizer and a heat treatment in accordance with Example 3 to obtain a porous resin film of 28 μm in thickness. The properties of this film are shown in Table 1.

The obtained porous resin film was applied as a battery separator for a lithium battery in the same way as Example 1. The test results are shown in Table 1.

EXAMPLE 5

The same procedure as Example 1 was conducted except for change of Dr to 43 and BUR to 1.1 to obtain a porous resin film of 60 μm in thickness. The properties of this film are shown in Table 1. The obtained porous resin film was used as a battery separator for a lithium battery in the same manner as Example 1. The test results are shown in Table 1.

EXAMPLE 6

30 parts by weight of ultra-high molecular weight polyethylene powder having a melting point of 135° C. and a molecular weight (viscosity-average) of $2\times10^6$ and 70 parts by weight of ceryl alcohol were fed into a 90 mm φ extruder. The materials were kneaded at a temperature of 230° C. and continuously extruded from a T-die having a width of 500 mm and a die gap of 3.5 mm. With the resin composition temperature maintained at 170° C. by the heated rolls and an infrared heater, the extruded product was taken off and stretched to a width of 1,250 mm at Dr of 30.7 by a pin tenter to effect melt-draft (melt-draft ratio: 76.7), followed by cooling to obtain a sheet of 40 μm in thickness.

This sheet was subjected to removal of ceryl alcohol and a heat-treatment in accordance with Example 1 to obtain a porous resin film of 20 μm in thickness. The properties of this film are shown in Table 1. The obtained porous resin film was applied as a lithium battery separator in the same way as Example 1. The test results are shown in Table 1.

EXAMPLE 7

The same procedure as Example 3 was carried out except for using ultra-high molecular weight polyethylene powder having a melting point of 135° C. and a molecular weight (viscosity average) of $2\times10^6$ and using a 50 mm φ twin-screw extruder and an inflation die having a die diameter of 40 mm and a die gap of 5.6 mm to conduct melt-draft (melt-draft ratio: about 96.8) at a die temperature of 170° C., Dr of 17.6 and BUR of 5.5 to obtain a sheet of 52 μm in thickness. Then, in the manner of Example 3, the plasticizer was removed and the sheet was subjected to a pinch roll heat-treatment to obtain a porous resin film of 28 μm in thickness. The shrinkage stress in machine direction and transverse direction of the obtained film was 12 gf (calculated as a film thickness of 25 μm) and a bubble point of the obtained film was 5.5 kg/cm². The other properties of this film are shown in Tables 1 and 2. The obtained porous resin film was applied as a lithium battery separator in the same way as Example 3. The test results are shown in Table 1.

EXAMPLE 8

By following the same procedure as Example 3, 25 parts by weight of ultra-high molecular weight polyethylene powder having a melting point of 135° C. and a molecular weight (viscosity average) of $2.5\times10^6$, 75 parts by weight of stearyl alcohol and 15 parts by weight of polyethylene wax having a molecular weight (viscosity average) of 3,500 were supplied into a 50 mm twin-screw extruder and extruded from an inflation die having a diameter of 40 mm and a die gap of 5.6 mm, melt-drafting the extruded product (melt draft ratio: about 96.8) at a die temperature of 170° C., Dr of 17.6 and BUR of 5.5, to obtain a sheet of 52 μm in thickness. Then the plasticizer was removed and the sheet was subjected to a pinch roll heat-treatment in accordance with Example 3 to obtain a porous resin film of 28 μm in thickness. This porous resin film was used as a lithium battery separator in the same way as Example 1. The shrinkage stress in machine direction and transverse direction of the obtained film was 7 gf (calculated as a film thickness of 25 μm) and a bubble point of the obtained film was 5.2 kg/cm². The other properties of the film and the lithium battery test results are shown in Table 1.

COMPARATIVE EXAMPLE 1

A battery was assembled by following the same procedure as Example 1 except for use of a commercially available polypropylene porous film (film thickness: 25 μm; pin puncture strength: 376 g (per 25 μm of thickness): air permeability: 660 sec/100 cc; thermal-shut down temperature: 177° C.; heat rupture temperature: 180° C.). The battery performance is shown in Table 1.

COMPARATIVE EXAMPLE 2

30 parts by weight of ultra-high-molecular-weight polyethylene powder having a melting point of 135° C. and a molecular weight (viscosity-average) of 2×10⁶, same as used in Example 1, and 70 parts by weight of ceryl alcohol were supplied into a 400 mm φ twin-screw extruder and the supplied materials were kneaded at a temperature of 230° C. and extruded continuously from a die having a width of 500 mm and a die gap of 0.25 mm at die temperature of 170° C. to form a sheet at a draft ratio of 2.5. The thickness of the obtained sheet was 85 μm. After cooling, ceryl alcohol was removed as in Example 1 and then the sheet was stretched 2.0 times by a roll stretcher (stretching temperature: 125° C.) to obtain a porous resin molding having 30 μm in thickness. The properties of this molding and the battery test results conducted in the same manner as Example 1 are shown in Table 1.

COMPARATIVE EXAMPLE 3

A sheet having 55 μm in thickness was formed by following the same procedure as Comparative Example 2 except that the die gap was adjusted to 0.16 mm. This sheet, not stretched, was subjected to the same heat-treatment as in Example 1 to obtain a porous resin film having 25 μm in thickness. The properties of this film and the battery test results conducted in the same manner as in Example 1 are shown in Table 1.

TABLE 1

Film forming conditions

| | Melt-draft ratio (—) | Draft ratio (—) | Draft ratio in transverse direction (—) | Film thickness (μm) |
|---|---|---|---|---|
| Example 1 | 35.1 | 35.1 | 1.0 | 27 |
| Example 2 | 98.8 | 98.8 | 1.0 | 28 |
| Example 3 | 94.4 | 39.3 | 2.4 | 24 |
| Example 4 | 5.5 | 1.0 | 5.5 | 28 |
| Example 5 | 43.2 | 44.5 | 2.8 | 25 |
| Example 6 | 76.7 | 30.7 | 2.5 | 20 |
| Example 7 | 96.8 | 17.6 | 5.5 | 28 |
| Example 8 | 96.8 | 17.6 | 5.5 | 28 |
| Comp. Example 1 | — | — | — | 25 |
| Comp. Example 2 | 2.5 | 2.5 | 1.0 | 30 |
| Comp. Example 3 | 2.5 | 2.5 | 1.0 | 25 |

Film performance

| Pin puncture strength (g/25 μm) | Air permeability (sec/100 cc) | Heat durability test *2 | Molding method |
|---|---|---|---|
| 155 | 785 | Shape maintained at 200° C. | T-die method |
| 242 | 4500 | Shape maintained at 200° C. | T-die method |
| 215 | 130 | Shape maintained at 200° C. | Inflation method |
| 123 | 65 | Shape maintained at 200° C. | Inflation method |
| 181 | 171 | Shape maintained at 200° C. | Inflation method |
| 201 | 142 | Shape maintained at 200° C. | T-die ± pin tender |
| 254 | 350 | Shape maintained at 200° C. | Inflation method |
| 244 | 300 | Shape maintained at 200° C. | Inflation method |
| 376 | 660 | Film broken at 180° C. | T-die ± pin tender |
| 165 | 155 | Film broken at 160° C. | T-die ± pin tender |
| 90 | 105 | Shape maintained at 200° C. | T-die ± pin tender |

| Film performance | | Battery performance (Li secondary battery) | |
|---|---|---|---|
| Thermal-shut down temp. (°C.) | Porosity (vol %) | Percent defectives in make-up of batteries (%) | External shortcircuiting test |
| 135 | 45 | 4 (No problem) | Reaction stopped (No problem) |
| 135 | 30 | 3 (No problem) | Reaction stopped (No problem) |
| 135 | 35 | 4 (No problem) | Reaction stopped (No problem) |
| 135 | 40 | 7 (No problem) | Reaction stopped (No problem) |
| 135 | 40 | 3 (No problem) | Reaction stopped (No problem) |
| 135 | 50 | 3 (No problem) | Reaction stopped (No problem) |
| 135 | 43 | 7 (No problem) | Reaction stopped (No problem) |
| 125 | 40 | 4 (No problem) | Reaction stopped (No problem) |
| 177 | 50 | 1 (No problem) | Reaction didn't stop Film broken |
| 135 | 50 | 3 (No problem) | Aftrer reaction Film broken *1 |
| 135 | 50 | 58 (Problem) | Reaction stopped (No problem) |

*1: After the pores have been shut down at a temperature of 135° C., the temperature thereof elevated over 160° C. due to remaining heat.
*2: When air permeability was measured at a temperature of 200° C. for the films of Examples 1–8, it was 0 (zero) in all of these films.
(Notes)
•The pin puncture strength are values calculated per 25 μm of film thickness.
•Melt-draft ratio = (draft ratio) × [draft ratio in the transverse direction (blow-up ratio in the case of inflation)].

TABLE 2

| | Cooling solidification time (sec) | Ultimate strength (kgf/cm²) | | point (kg/cm²) |
|---|---|---|---|---|
| | | Machine direction | Transverse direction | |
| Example 1 | 8.8 | 500 | 200 | 3.5 |
| Example 2 | 12.2 | 650 | 180 | 4.5 |
| Example 3 | 6.8 | 450 | 230 | 3.5 |
| Example 7 | — | 550 | 300 | 5.5 |
| Example 8 | — | — | — | 5.2 |

What is claimed is:

1. A process for producing a porous film or sheet, which process comprises the steps of melt-extruding a composition consisting essentially of an ultra-high molecular weight polyethylene having a viscosity-average molecular weight of 500,000 to 4,000,000 and a plasticizer thereby forming a film or sheet, giving a deforming stress to the film or sheet to effectuate melt-draft, and after cooling, removing the plasticizer from the obtained film or sheet.

2. A process for producing a porous film or sheet having a porosity of 30 to 50%, which process comprises the steps of melt-extruding a composition consisting essentially of an ultra-high molecular weight polyethylene having a viscosity-average molecular weight of 500,000 to 4,000,000 and a plasticizer thereby forming a film or sheet, giving a deforming stress thereto to effectuate melt-draft, and after cooling, removing the plasticizer from the obtained film or sheet.

3. A process for producing a porous film or sheet, which comprises the steps of:
(a) melt-extruding a composition consisting essentially of an ultra-high molecular weight polyethylene having a viscosity-average molecular weight in a range of 500,000 to 4,000,000 and a plasticizer into a film or a sheet;
(b) applying a deforming stress to the extruded film or sheet while in a molten state to effectuate melt-drafting;
(c) cooling; and thereafter
(d) removing the plasticizer for the resulting film or sheet.

4. The process according to claim 3, wherein the deforming stress applied to the extruded film or sheet in step (b) provides melt-draft ratio of 5 to 1,000 as represented by the following formula:

$$\text{Melt-draft ratio} = (D \times \rho_1)/(t \times \rho_2)$$

D: die gap (mm)
$\rho_1$: melt density (g/cm$^3$) of resin composition
t: thickness (ram) of the molded film or sheet
$\rho_2$: solid density (g/cm$^3$) of the molded film or sheet.

5. The process according to claim 3, wherein the melt extrusion of step (a) is carried out at a temperature of 140° to 240 ° C.

6. The process according to claim 3, wherein the melt-draft of step (b) is carried out at a temperature of 130° to 240° C.

7. The process according to claim 3, wherein step (c) the melt-drafted film or sheet is cooled so that the cooling solidification time represented by the following formula is not more than 50 seconds:

$$T = L/(V_1 - V_0) \times \ln(V_1/V_0)$$

T: cooling solidification time (sec)
L: distance (cm) between the lip outlet and cooling and solidifying line
$V_0$: resin transfer speed (cm/sec) composition at the lip outlet
$V_1$: resin transfer speed (cm/sec) composition in the cooling and solidifying line.

8. The process according to claim 3, wherein the plasticizer is removed in step (d) by extraction with an organic solvent.

9. The process according to claim 3, wherein in step (a) the resin composition is melt-extruded into a film or sheet from a die having a die gap of 2 to 20 mm.

* * * * *